United States Patent [19]

Sommer

[11] 3,903,142

[45] Sept. 2, 1975

[54] PROCESS OF PRODUCING AMINO METHANE DIPHOSPHONIC ACID AND ITS SALTS

[75] Inventor: Klaus Sommer, Heidelberg, Germany

[73] Assignee: Benckiser-Knapsack GmbH, Ladenburg (Neckar), Germany

[22] Filed: Jan. 24, 1973

[21] Appl. No.: 326,487

[30] Foreign Application Priority Data
Jan. 25, 1972  Germany............................ 2203366

[52] U.S. Cl................................. 260/502.5; 210/58
[51] Int. Cl.² ............................................ C07F 9/38
[58] Field of Search.................................. 260/502.5

[56] References Cited
UNITED STATES PATENTS
3,565,949   2/1971   Cummins.......................... 260/502.5

FOREIGN PATENTS OR APPLICATIONS
1,002,355   7/1957   Germany ......................... 260/502.5
1,958,124   5/1971   Germany ......................... 260/502.5

*Primary Examiner*—Joseph E. Evans
*Attorney, Agent, or Firm*—Erich M. H. Radde

[57] ABSTRACT

Amino methane diphosphonic acid and its salts are prepared by a simple process and in a high yield by reacting phosphorous acid and a phosphorus trihalogenide, preferably phosphorus trichloride with hydrocyanic acid or an alkali metal salt thereof in the presence of a catalyst such as a polyvalent metal halogenide or a polyvalent metalloid halogenide without heating, preferably with cooling to between $-10°$ C. and $+10°$ C., and recovering, by hydrolysis, the amino methane diphosphonic acid from the reaction mixture.

14 Claims, No Drawings

PROCESS OF PRODUCING AMINO METHANE DIPHOSPHONIC ACID AND ITS SALTS

BACKGROUND OF THE INVENTION

1. Field of the Invention

The present invention relates to a novel and improved process of making amino methane phosphonic acid and more particularly to a process of making amino methane phosphonic acid and its salts by using a phosphorus trihalogenide, preferably phosphorus trichloride.

2. Description of the Prior Art

1-Amino alkane-1,1-diphosphonic acids are obtained according to German Pat. No. 1,002,355 by reacting alkyl nitriles with phosphorus halogenides. In this reaction, however, satisfactory yields could be obtained with phosphorus tribromide only.

Furthermore, it is known from German published application No. 1,958,124 to react phosphorus trichloride with formamide whereby a solid reaction product is obtained which is dissolved in sodium hydroxide solution and is hydrolyzed. Subsequently the solution is passed through an acid ion exchange agent, the filtrate is concentrated, and resulting amino methane diphosphonic acid is precipitated therefrom by the addition of acetone.

SUMMARY OF THE INVENTION

It is one object of the present invention to provide a simple and effective process of directly producing amino methane diphosphonic acid in an almost quantitative yield which process is substantially free of the disadvantages encountered heretofore by carrying out the known process.

Another object of the present invention is to provide a simple and effective process of producing the salts and especially the alkali metal and alkaline earth metal salts of amino methane diphosphonic acid.

Other objects of the present invention and advantageous features thereof will become apparent as the description proceeds.

In principle the novel process according to the present invention comprises the step of reacting a mixture of a phosphorus trihalogenide, preferably phosphorus trichloride and phosphorous acid with hydrocyanic acid in the presence of a catalyst of the type of polyvalent metal or metalloid halogenides without heating, i.e. at room temperature and, if required, even with cooling. Especially useful catalysts are aluminum trichloride $AlCl_3$, boron tribromide $BBr_3$ and its etherate $BBr_3.O(C_2H_5)_2$, antimony pentachloride $SbCl_5$, antimony trichloride $SbCl_3$, antimony trifluoride $SbF_3$, arsenic trichloride $AsCl_3$, and zinc chloride $ZnCl_2$. The amounts of catalyst added during the reaction are in general between about 0.2 %, by weight, and 2.0 %, by weight. The reaction proceeds almost quantitatively and yields first products of higher molecular weight which are converted into amino methane diphosphonic acid by hydrolysis with water or hydrochloric acid. To carry out the hydrolysis with hydrochloric acid has the advantage that the reaction proceeds less strongly exothermically than when using water. On hydrolysis the amino methane diphosphonic acid precipitates in the form of a difficultly soluble, white crystal powder.

The order in which the reactants are caused to react with each other is immaterial. Liquid anhydrous hydrocyanic acid and phosphorous acid can first be mixed with each other and a phosphorus trichloride can then be added drop by drop thereto. Or liquid hydrocyanic acid can be caused to drop into a mixture of phosphorus trichloride and phosphorous acid. Or gaseous hydrocyanic acid can be introduced into such a mixture. Of course, the reaction must be effected under substantially anhydrous condition.

It is also possible to carry out the reaction in solution in suitable solvents. Dioxane, dialkoxyalkanes such as dimethoxy ethane or diethoxy ethane, tetramethylene sulfone, diglycol dialkyl ethers such as diglycol diethyl ether or diglycol dimethyl ether, bis-chloro alkyl ethers such as $\beta,\beta'$-bis-chloro ethyl ether or $\beta,\beta'$-bis chloro propyl ether, and other solvents which do not contain active hydrogen, i.e., protons have proved to be especially useful solvents.

The proportion of phosphorus trichloride to phosphorous acid can be between about 1 : 2 and about 5 : 1. Preferably, however, a proportion of about 1 : 1 is employed.

Advantageously the reaction is carried out at room temperature under substantially anhydrous conditions by using a reaction vessel provided with a vigorously acting stirrer and with an intensive cooling-type condenser with attached cooling trap. The cooling liquid of the intensive cooling condenser is kept between 0° C. and −20° C. This is sufficient to condense substantially all of the evaporating hydrocyanic acid and to return it to the reaction vessel. The cooling trap which serves as a safety measure, is filled with a mixture of methanol and dry ice. Traces of hydrocyanic acid which are carried along by the escaping hydrogen chloride are condensed in said trap together with part of the hydrogen sulfide formed during the reaction from the sulfur dioxide which is usually admixed as stabilizer to the hydrocyanic acid.

Another way of carrying out the process of this invention consists in allowing a solution of phosphorous acid in phosphorus trichloride to flow from the top through a Hempel-type column filled with large Raschig rings or with saddle-shaped packing and cooled from the outside while gaseous hydrocyanic acid is countercurrently passed therethrough from the bottom. In order to cause complete reaction of the hydrocyanic acid, it is also necessary to provide an effective cooling trap so as to condense escaping gaseous hydrocyanic acid and to return it into the reaction column.

In order to produce directly the salts of amino methane diphosphonic acid, a mixture of phosphorus trichloride and phosphorous acid is reacted with pulverized sodium or potassium cyanide in the presence of the above mentioned catalysts. The yields obtained thereby, however, are lower than those achieved by reaction with anhydrous hydrocyanic acid and the resulting reaction product is usually of yellowish or yellow-brown coloration. The free acid is obtained from said alkali metal salts by a treatment with concentrated acid or with acid ion exchange agents.

The alkali metal or alkaline earth metal salts can be produced in a simple manner by neutralizing an aqueous suspension or amino methane diphosphonic acid with alkali metal of alkaline earth metal hydroxides. The alkali metal salts are distinguished from the free acids by their greater solubility. Their solubility is usually sufficient for employing them for many purposes, for instance, in water treatment and the like.

100 g. of the amino methane diphosphonic acid have a calcium chelating power of 33.5 g. of calcium at a pH or 10.0 as determined by tests with the calcium activity electrode as sold, for instance, by Orion Research Inc. of Cambridge, Mass.

DESCRIPTION OF THE PREFERRED EMBODIMENTS

The following examples serve to illustrate the present invention without, however, limiting the same thereto.

EXAMPLE 1

100 g. of phosphorous acid and 1 g. of aluminum chloride are suspended in 200 g. of phosphorus trichloride in a 500 ml. three-necked flask provided with intensive cooling-type condenser, stirrer with mercury trap, and a dropping funnel which can be cooled. The mixture is kept at a temperature between 0° C. and 10° C. 40 ml. of anhydrous hydrocyanic acid which is cooled in the dropping funnel to a temperature of 0° C., are added drop by drop to said mixture within 30 minutes while stirring vigorously. After its addition stirring of the reaction mixture is continued for two more hours at room temperature. The mixture is allowed to stand until excess phosphorus trichloride has separated. It is removed by decanting it from the highly viscous reaction product and can be used again for further reaction. The highly viscous reaction product is hydrolyzed by stirring with 400 ml. of concentrated hydrochloric acid at a temperature between 50° C. and 80° C. After allowing the hydrolysis mixture to stand for 1 hour, the precipitated amino methane diphosphonic acid is filtered off by suction, washed with methanol, and air-dried. 127 g. of amino methane diphosphonic acid are obtained as a white, finely crystalline powder.

Melting point: 299°–302° C. with decomposition.
Solubility at 20° C.: 0.35 g. in 100 ml. of water.
The pH-value of said solution is 1.8. Analysis:

| Calculated: | 32.43 % P; | 7.38 % N. |
|---|---|---|
| Found: | 32.3 % P; | 7.41 % N. |

In place of 1 g. of aluminum chloride as catalyst, there can be used the same amount of antimony pentachloride.

EXAMPLE 2

The apparatus used is the same as in Example 1. 27 g. of gaseous hydrocyanic acid are introduced into a suspension of 81 g. of phosphorous acid and 0.5 g. of aluminum chloride in 200 g. of phosphorus trichloride at 5° C. while stirring. After introduction of the hydrocyanic acid is completed, stirring of the reaction mixture at room temperature is continued for 3 more hours. The resulting viscous reaction product is hydrolyzed and further worked up as described in Example 1.

Yield: 118 g. corresponding to 61 % of the theoretical yield, calculated for hydrocyanic acid.

EXAMPLE 3

82 g. of phosphorous acid and 0.5 g. of boron trifluoride-etherate $BF_3.O(C_2H_5)_2$ are introduced into the apparatus used in Example 1 whereby a cooling trap is attached to the intensive cooling-trap condenser. 27 g. of anhydrous hydrocyanic acid are condensed thereon. Thereafter, 250 g. of phosphorus trichloride are added drop by drop to the mixture at a temperature between −10° C. and +5° C. while stirring. The resulting reaction mixture is allowed to warm up to room temperature and stirring is continued at said temperature for 3 to 4 more hours. The reaction mixture is worked up as described in Example 1.

Yield: 113 g. corresponding to 59 % of the theoretical yield, calculated for hydrocyanic acid.

EXAMPLE 4

24.5 g. of sodium cyanide are stirred in the apparatus used in Example 1 with 80 g. of phosphorous acid, 140 g. of phosphorus trichloride, and 1 g. of aluminum chloride for 5 hours. An oily phase is formed thereby, from which excess phosphorus trichloride is recovered by decanting. The oily residue is hydrolyzed by means of 250 ml. of concentrated hydrochloride acid. 74 g. of amino methane diphosphonic acid contaminated with a small amount of sodium chloride and the sodium salt of amino methane diphosphonic acid, are obtained thereby. To purify the crude product, it is boiled with hot water to which a small amount of hydrochloric acid and activated charcoal are added or its aqueous solution is passed through a column of an acid ion exchange agent. Yield of pure acid: 64 g. corresponding to 67 % of the theoretical yield calculated for hydrocyanic acid.

EXAMPLE 5

160 g. of phosphorous acid and 1 g. of zinc chloride are dissolved in a mixture of 200 ml. of dioxane and 200 ml. of phosphorus trichloride. 40 ml. of anhydrous hydrocyanic acid are added drop by drop thereto at 5° C. within 30 minutes while stirring vigorously. A highly viscous, colorless reaction product starts to separate after a few minutes. Its separation is completed after 1 hour. Unreacted phosphorus trichloride and phosphorus acid are decanted therefrom together with the solvent. This mixture can be used again for the reaction. The remaining residue is washed with 100 ml. of dioxane and the resulting solution is hydrolyzed at 50° C. by the addition of 400 ml. to 500 ml. of concentrated hydrochloric acid while stirring vigorously. Pure amino methane diphosphonic acid precipitates in the form of a crystalline white powder.

Yield: 134 g.

EXAMPLE 6

108 g. of water are added drop by drop to 350 ml. of phosphorus trichloride while stirring and cooling. After hydrolysis is completed, the mixture is cooled to 0° C., 1 g. of zinc chloride is added, and 40 ml. of anhydrous hydrocyanic acid cooled to a temperature of 0° C. are added drop by drop while stirring vigorously. After 2 hours, excess phosphorus trichloride is removed by decanting and the residue is hydrolyzed as described hereinabove.

Yield: 114 g. of amino methane diphosphonic acid.

In place of zinc chloride, the same amount of aluminum chloride can be added.

In place of phosphorus trichloride used in the preceding examples there can be employed equivalent amounts of phosphorus tribromide and phosphorus triiodide. When using phosphorus triiodide, it is the preferred procedure to operate in solution in a suitable solvent as described hereinabove in Example 5.

The acid ion exchange agent as employed in Example 4 may be any commercially available ion exchange agent such as, for instance, the acid ion exchange agent sold under the trademark "DUOLITE C 20" by Chemical Process Co. or the acid ion exchange agent sold under the trademark "LEWATIT S 100" by Farbenfabriken Bayer.

Of course, many changes and variations in the order in which the reactants are combined with each other, in the amounts and proportions of the reactants, in the type of catalyst and solvent used, in the manner in which the intermediate, high molecular, viscous reaction product is hydrolyzed, and in the acid used for hydrolysis, and the like may be made in the examples given hereinabove in accordance with the principles set forth herein and in the claims annexed hereto.

I claim:

1. In a process of producing amino methane diphosphonic acid, the steps which comprise
   a. causing a phosphorus trihalogenide selected from the group consisting of phosphorus trichloride, phosphorus tribromide, and phosphorus triiodide, phosphorous acid, and hydrocyanic acid to react in the presence of a halogenide catalyst selected from the group consisting of aluminum chloride, zinc chloride, boron tribromide, antimony chlorides, antimony trifluoride, arsenic trichloride, and the etherate of boron trifluoride, the proportion of phosphorus trihalogenide to phosphorous acid in the reaction mixture being between about 1 : 2 and about 5 : 1 under substantially anhydrous conditions at a temperature between about −10°C. and not substantially exceeding room temperature; and
   b. hydrolyzing the resulting reaction product of higher molecular weight to amino methane diphosphonic acid.

2. The process of claim 1, in which the reaction is carried out with cooling.

3. The process of claim 1, in which the reaction is carried out at a temperature between about +10° C. and about −10° C.

4. The process of claim 1, in which the reaction is carried out in solution in a substantially inert organic solvent selected from the group consisting of dioxane, a dialkoxy alkane, tetramethylene sulfone, a diglycol dialkyl ether, and a bis-(chloro alkyl) ether.

5. The process of claim 4, in which the inert organic solvent is a solvent selected from the group consisting of dioxane, a dialkoxy alkane, tetramethylene sulfone, a diglycol dialkyl ether, and a bis-(chloro alkyl) ether.

6. The process of claim 1, in which, after the reaction is completed, excess phosphorus trihalogenide is removed from the reaction mixture, and the resulting reaction product is subjected to hydrolysis to yield the amino methane diphosphonic acid.

7. The process of claim 6, in which hydrolysis is effected by means of concentrated hydrochloric acid.

8. The process of claim 1, in which liquid anhydrous hydrocyanic acid is employed as the one reactant.

9. The process of claim 1, in which gaseous hydrocyanic is employed as the one reactant.

10. The process of claim 1, in which the resulting amino methane diphosphonic acid is additionally converted into its salt selected from the group consisting of alkali metal salts and alkaline earth metal salts by neutralizing its aqueous suspension with a metal hydroxide selected from the group consisting of an alkali metal hydroxide and an alkaline earth metal hydroxide.

11. In a process of producing amino methane diphosphonic acid, the steps which comprise
    a. causing a phosphorus trihalogenide selected from the group consisting of phosphorus trichloride, phosphorus tribromide, and phosphorus triiodide, phosphorous acid, and an alkali metal cyanide in finely pulverized form to react in the presence of a halogenide catalyst selected from the group consisting of aluminum chloride, zinc chloride, boron tribromide, antimony chlorides, antimony trifluoride, arsenic trichloride, and the etherate of boron trifluoride, the proportion of phosphorus trihalogenide to phosphorous acid in the reaction mixture being between about 1 : 2 and about 5 : 1, under substantially anhydrous conditions at a temperature between about −10°C. and not substantially exceeding room temperature; and
    b. isolating the resulting alkali metal salt of amino methane diphosphonic acid from the reaction mixture.

12. The process of claim 11, in which, after the reaction is completed, excess phosphorus trihalogenide is removed from the reaction mixture, and the resulting reaction product is subjected to hydrolysis to yield the amino methane diphosphonic acid.

13. The process of claim 1, in which the phosphorus trihalogenide is phosphorus trichloride.

14. The process of claim 11, in which the phosphorus trihalogenide is phosphorus trichloride.

* * * * *

PO-1050
(5/69)

UNITED STATES PATENT OFFICE
CERTIFICATE OF CORRECTION

Patent No. 3,903,142          Dated September 2, 1975

Inventor(s) KLAUS SOMMER

It is certified that error appears in the above-identified patent and that said Letters Patent are hereby corrected as shown below:

Column 2, line 62; column 3, line 3: "or" should read -- of --.

Column 4, line 17: "hydrochloride" should read -- hydrochloric --.

Column 4, lines 36 and 37: "phosphorus acid" should read -- phosphorous acid --.

Signed and Sealed this third Day of February 1976

[SEAL]

Attest:

RUTH C. MASON
Attesting Officer

C. MARSHALL DANN
Commissioner of Patents and Trademarks